(12) United States Patent
Gonzales

(10) Patent No.: US 12,535,501 B2
(45) Date of Patent: Jan. 27, 2026

(54) PROBE SYSTEM WITH INTEGRATED CHOKE INDUCTOR

(71) Applicant: NORTHROP GRUMMAN SYSTEMS CORPORATION, Falls Church, VA (US)

(72) Inventor: Jesse H. Gonzales, Mclean, VA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 177 days.

(21) Appl. No.: 18/387,083

(22) Filed: Nov. 6, 2023

(65) Prior Publication Data

US 2025/0147069 A1    May 8, 2025

(51) Int. Cl.
*G01R 1/067* (2006.01)

(52) U.S. Cl.
CPC ....... *G01R 1/06766* (2013.01); *G01R 1/0675* (2013.01); *G01R 1/06772* (2013.01)

(58) Field of Classification Search
CPC ...... G01R 1/06722; G01R 1/06; G01R 1/067; G01R 1/06705; G01R 1/06711; G01R 1/06716; G01R 1/06727; G01R 1/06733; G01R 1/06738; G01R 1/06744; G01R 1/0675; G01R 1/06755; G01R 1/06761; G01R 1/06766; G01R 1/06772; G01R 1/06777; G01R 1/073; G01R 1/07307; G01R 1/07314; G01R 1/07321; G01R 1/07328; G01R 1/07335; G01R 1/07342; G01R 1/0735; G01R 1/07357; G01R 1/07364; G01R 1/07371; G01R 1/07378; G01R 1/07385; G01R 1/07392

See application file for complete search history.

(56) References Cited

U.S. PATENT DOCUMENTS

| | | |
|---|---|---|
| 7,205,784 B2 | 4/2007 | Hayden et al. |
| 7,352,258 B2 | 4/2008 | Andrews et al. |
| 11,631,958 B2 | 4/2023 | Kubota |

(Continued)

FOREIGN PATENT DOCUMENTS

WO    2004/034071 A1    4/2004

OTHER PUBLICATIONS

Winslow, Thomas A., "Conical Inductors for Broadband Applications", IEEE Microwave Magazine (Year: 2005).*

*Primary Examiner* — Lee E Rodak
*Assistant Examiner* — Jeremiah J Barron
(74) *Attorney, Agent, or Firm* — KATTEN MUCHIN ROSENMAN LLP

(57) ABSTRACT

The proposed probe wedge or probe card is configured to be used for a wafer probe system to enhance the test process more efficiently. The probe wedge or probe card includes one or more inductive probing needles and one or more conductive probing needles. Each inductive probing needle includes a shaft and a choke inductor integrated with the shaft. The shaft includes a first end section, a second end section, and an intermediate section between the first and second end sections. The first and second end sections are made of an electrically conductive material and the intermediate section is made of an electrically non-conductive material. The choke inductor includes a first terminal connected to the first end section of the shaft and a second terminal connected to the second end section of the shaft.

15 Claims, 4 Drawing Sheets

(56) References Cited

U.S. PATENT DOCUMENTS

| | | | |
|---|---|---|---|
| 2006/0290357 A1* | 12/2006 | Campbell | G01R 1/06772 |
| | | | 324/600 |
| 2014/0002069 A1* | 1/2014 | Stoddard | G01R 33/028 |
| | | | 324/239 |
| 2021/0389348 A1* | 12/2021 | Lesher | G01R 1/06772 |
| 2022/0407284 A1* | 12/2022 | Kubota | H01S 5/423 |
| 2024/0012025 A1* | 1/2024 | Crippa | G01R 1/06772 |
| 2024/0094259 A1* | 3/2024 | Veeramani | G01R 1/06738 |

* cited by examiner

PROBE SYSTEM WITH INTEGRATED CHOKE INDUCTOR

BACKGROUND

In the semiconductor processes, devices such as integrated circuits are fabricated on a wafer. Before further processing the wafer, these devices need to be inspected to confirm that the devices are properly fabricated on the wafer as intended. Wafer probing is a process in which each device on the wafer is electrically tested. Wafer probing is generally performed with an automated wafer probe system. The wafer probe system holds a wafer on a stable mount and places a set of thin needles or pins on the wafer or devices formed on the wafer. The needles or pins provide electrical contacts needed to test the devices on the wafer. The devices on the wafer receive test signals through the needles. The test signals from the measuring instrument are transmitted to individual devices on a wafer and the signals are then returned from the device.

The wafer probing test generally includes direct current (DC) probing tests and radio-frequency (RF) probing tests. The DC probing tests are conducted to discover fabrication defects and design characteristics. The RF probing tests are conducted on the devices that work on radio frequencies such as RF transceivers, RF switches and power amplifier. The wafer probing is also conducted to measure electrical properties and parameters of the devices on the wafer. The test signals generally include DC test signals and RF test signals. However, in the DC probing tests, there is an issue caused by reflection of the RF test signals. There are needs to suppress the RF test signals during the DC probing test to conduct the DC probing test more accurately.

SUMMARY

The disclosed invention provides a probe wedge or probe card having probing needles integrated with choke inductor for direct current (DC) bias. The probe wedge or probe card of the disclosed invention provides probe tips or needles that are constructed to more efficiently suppress radio-frequency (RF) signals while allowing flow of DC current to a device for inspection. This probe wedge of the disclosed invention allows more efficient wafer biasing and reduces the need for die packages for testing purposes. The probe wedge or probe card may be used for biasing active devices such as low noise amplifiers (LNA), high-power amplifiers (HPA) and driver amplifiers without interfering with the impedance match. This probe wedge or probe card may be used for testing monolithic microwave integrated circuit (MMIC) on wafers that do not have on-chip inductors.

These advantages and others are achieved, for example, by a probe wedge or probe card for a wafer probe system that includes one or more inductive probing needles and a choke inductor comprising a first terminal and a second terminal. Each inductive probing needle includes a shaft having a first end section, a second end section, and an intermediate section between the first and second end sections. The first and second end sections are made of an electrically conductive material and the intermediate section is made of an electrically non-conductive material. The first terminal of the choke inductor is connected to the first end section of the shaft and the second terminal of the choke inductor is connected to the second end section of the shaft. The probe wedge or probe card may further include one or more conductive probing needles made of an electrically conductive material. The choke inductor may include a coil inductor in which an insulated wire is wrapped around the intermediate section of the shaft. The coil inductor has a conical shape.

These advantages and others are achieved, for example, by a wafer probe system that includes a probe machine and the probe wedge or probe card coupled to the probe machine and receiving the probing signals from the probe machine. The probe machine is configured to supply probing signals to inspect one or more devices formed on a wafer. The wafer probe system may further include a signal source that supplies the probing signals to the probe machine. The signal source is configured to combine radio-frequency (RF) signals and direct current (DC) signals to generate the probing signals. The signal source may include a bias tee that is configured to combine the RF signals and the DC signals.

BRIEF DESCRIPTION OF THE DRAWINGS

The preferred embodiments described herein and illustrated by the drawings hereinafter are to illustrate and not to limit the invention, where like designations denote like elements.

DETAILED DESCRIPTION

Figure 1:
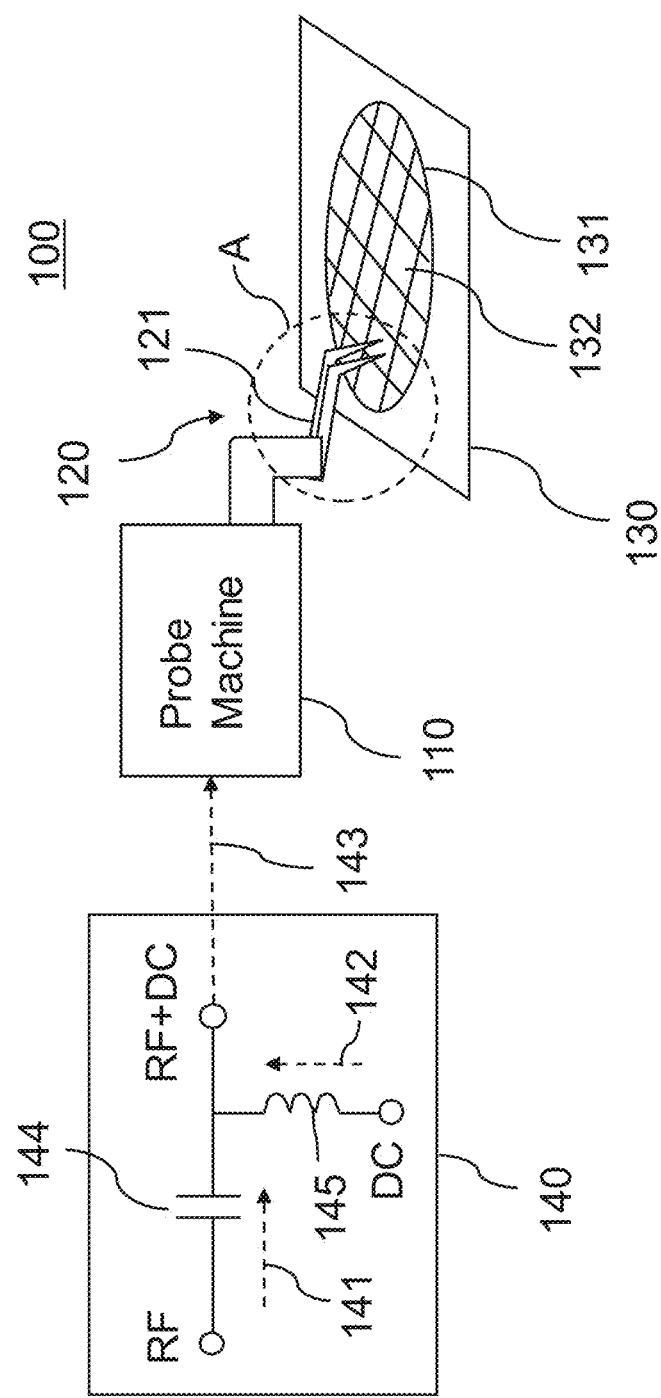
FIG. 1 is a diagram illustrating a wafer probe system to inspect integrated circuits or devices on a wafer.

The following detailed description is merely exemplary in nature and is not intended to limit the described embodiments or the application and uses of the described embodiments. All of the implementations described below are exemplary implementations provided to enable persons skilled in the art to make or use the embodiments of the disclosure and are not intended to limit the scope of the disclosure, which is defined by the claims. It is also to be understood that the drawings included herewith only provide diagrammatic representations of the presently preferred structures of the present invention and that structures falling within the scope of the present invention may include structures different than those shown in the drawings.

With reference to FIG. 1, shown is a diagram illustrating wafer probe system 100 to inspect integrated circuits or devices on a wafer. For the purpose of description, FIG. 1 shows a simplified diagram of the probe system 100. The probe system 100 of the disclosed invention includes probe machine 110, probe wedge or probe card 120 connected to the probe machine 110, probing pins or needles 121 that are mounted on the probe wedge or probe card 120, wafer chuck 130 that holds wafer 131 that is to be tested. One or more devices 132 may be formed on the wafer 131. The devices 132 may include transistors, connectors, and integrated circuits such as monolithic microwave integrated circuit (MMIC).

The probe system 100 may include signal source 140 connected to the probe machine 110. The signal source 140 supplies probing signals 143 to the probe machine 110. The signal source 140 may be configured to combine RF signals 141 and DC signals 142 to generate the probing signals 143. FIG. 1 exemplarily shows bias tee for the signal source 140. However, the other known types of signal sources may be used for the probe system 100. The bias tee 140 includes capacitance 144 to pass the RF signals 141 and inductor 145 to pass DC signals 142. The bias tee 140 generates probing signal 143 that is a combination of RF signals 141 and DC signals 142. FIG. 1 shows an example of the bias tee 140 circuit. The bias tee 140 circuit, however, is not limited to the circuit shown in FIG. 1. The probing needles 121 are configured to contact the devices or integrated circuits 132 on the water 131 to supply the probing signals 143 from the signal source 140. There may be a plurality of probing needles 121 to perform various electrical tests on the devices or integrated circuits 132. The probe machine 110 may have actuators, circuits and processors to automatically move the probe wedge 120 to proper positions on the wafer 131 and to adjust and supply probing signals 143 to the device or integrated circuit 132 on the wafer 131.

The probing signals 143 include RF signal component 141 and DC signal component 142. The DC signals 142 are provided for DC probing test (or DC bias test) of the device or integrated circuit 132 and/or the wafer 131. DC probing tests may reveal fabrication defects and design characteristics that are out of performance tolerance. The DC probing test may include checking for any short circuit or break in the device or integrated circuit 132. The DC probing test determines, for example, whether pins of the integrated circuit 132 and their connections are intact. It also may include tests to check whether the DC electrical parameters of the integrated circuit 132 are within specific ranges. The RF probing signals 141 are provided for RF probing test of the device or integrated circuit 132. The RF probing test may be conducted on the devices or integrated circuits 132, which work on radio frequencies such as RF transceivers, RF LNA, RF switches and power amplifier. The probing signals 143 also may be used to measure the electrical parameters of the device including integrated circuits, resistors, capacitors, diodes, transistors, and inductors, and may be used for reliability test and failure analysis.

Figure 2:
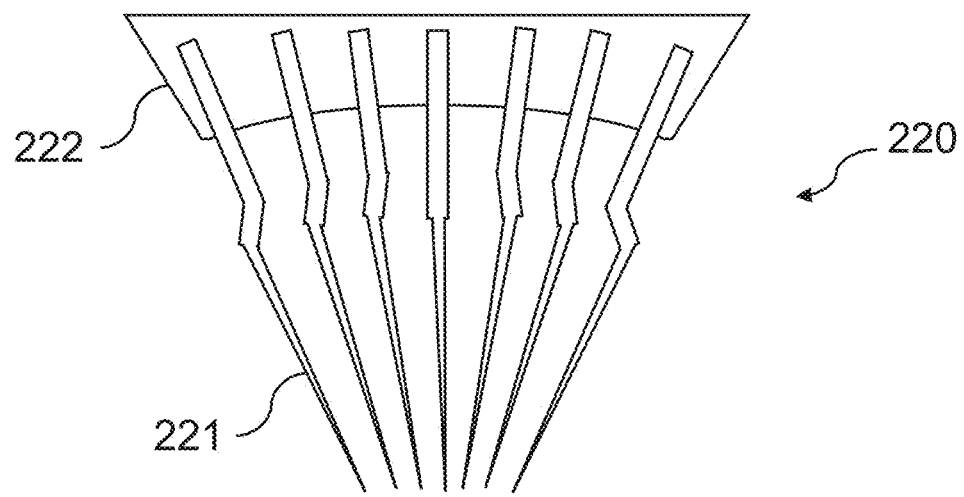
FIG. 2 is an illustration of a probe wedge or probe card shown in the portion A of FIG. 1.

With reference to FIG. 2, shown is an illustration of probe wedge or probe card 220 shown in the portion A of FIG. 1. For description purpose, FIG. 2 shows seven (7) probing needles 221. However, the number of probing needles is not limited, and any number of probing needles may be employed. The probing needles 221 are mounted on the connection pad 222 with electrical connections to the probe machine 110. The probing needles 221 may be made of high electrically conductive materials with proper hardness. The probing needles 221 may be made of materials such as tungsten, tungsten-rhenium, and beryllium-copper. The probing signals 143 are supplied to the integrated circuits 132 through the probing needles 221 to test the device or integrated circuits 132.

The typical probing needles 221, however, have issues when the probing needles 221 are used with the probing signals 143 for DC probing tests. The issues are caused by the RF signals 141 included in the probing signals 143. For example, during the processes to test Superlattice Castellated Field Effect Transistor (SLCFET) Monolithic Microwave Integrated Circuit (MMIC), the probing signals 143, which includes the RF signal component 141 and the DC signal component 142, are applied to the probing needles 221. This process, however, significantly degrades the testing performance while biasing the SLCFET MMIC, due to the reflections of the RF signals 141 from the wafer 131. In order to solve this issue, the wafers need to be diced and packaged before the testing begins. This may prolong the design cycle and increase a number of die packages for testing purposes, which also increases the cost for testing.

Figure 3:
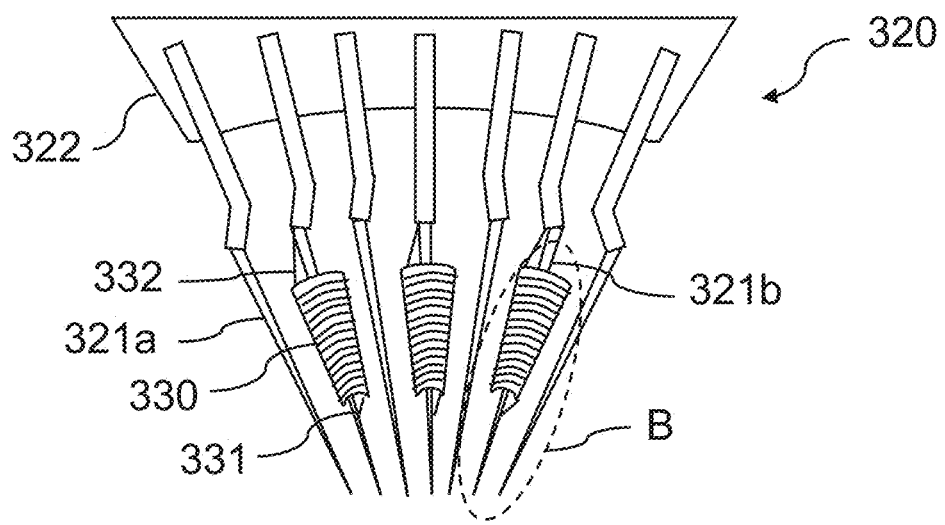
FIG. 3 is an illustration of a probe wedge or probe card of the disclosed invention, which is used for the probe wedge or probe card shown in the portion A of FIG. 1.

With reference to FIG. 3, shown is an illustration of the probe wedge or probe card 320 of the disclosed invention, which is used for the probe wedge or probe card 120 shown in the portion A of FIG. 1. The probe wedge or probe card 320 includes second type of probing needle 321b. The second type probing needle 321b is referred to as an electrically inductive probing needle, while the first type probing needle 321a, which is the same the probing needles 221 shown in FIG. 2, is referred to as an electrically conductive probing needle. The conductive probing needle 321a is made of high electrically conductive material. The inductive probing needle 321b includes choke inductor 330 to improve the performance during DC probing test and to remove the issues described above. FIG. 3 exemplarily shows the probing needles 321a, 321b arranged in a wedge shape. However, the probing needles 321a, 321b may be arranged in any other shapes.

In an embodiment, the probe wedge or probe card 320 may include both one or more conductive probing needles 321a and one or more inductive probing needles 321b. Both probing needles 321a, 321b are mounted on the connection pad 322 with electrical connections to the probe machine 110. FIG. 3 exemplarily shows four (4) conductive probing needles 321a and three (3) inductive probing needles 321b. However, the numbers of conductive and inductive probing needles are not limited, and any numbers of conductive and inductive probing needles may be employed. The positions of the conductive and inductive probing needles are not limited to the positions shown in FIG. 3. The probing needles of the probe wedge or probe card 320 may be any combination of the conductive probing needles 321a and conductive probing needles 321b. For example, the probing needles of the probe wedge or probe card 320 may be all inductive probing needles 321b, or some of the probing needles may be inductive probing needles 321b at various positions.

Figure 4A:
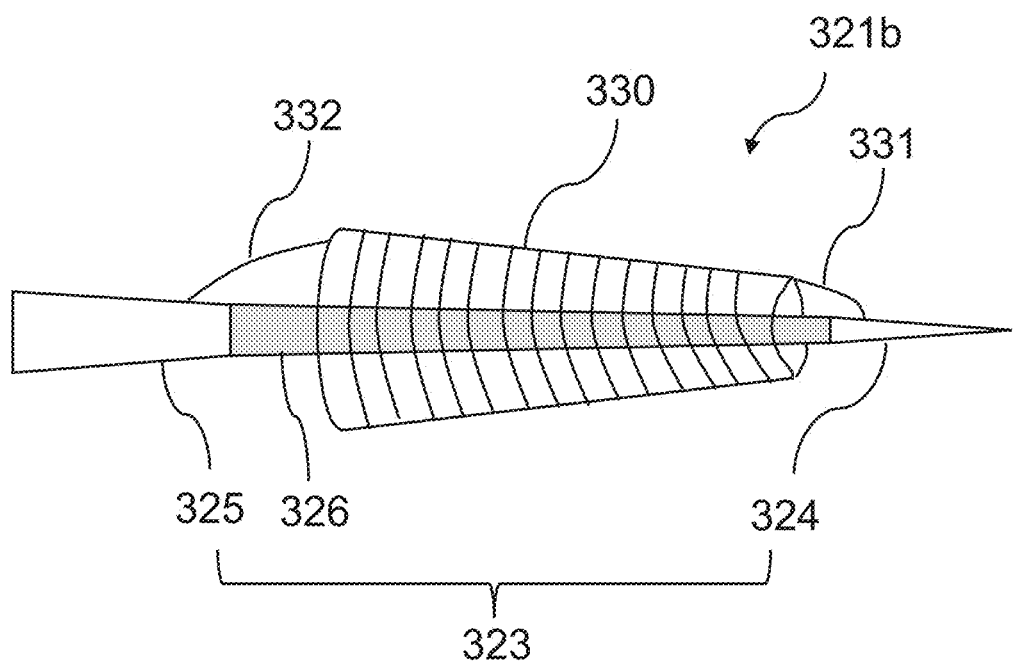
FIGS. 4A and 4B are illustrations of embodiments of the inductive probing needles shown in the portion B of FIG. 3.
Figure 4B:
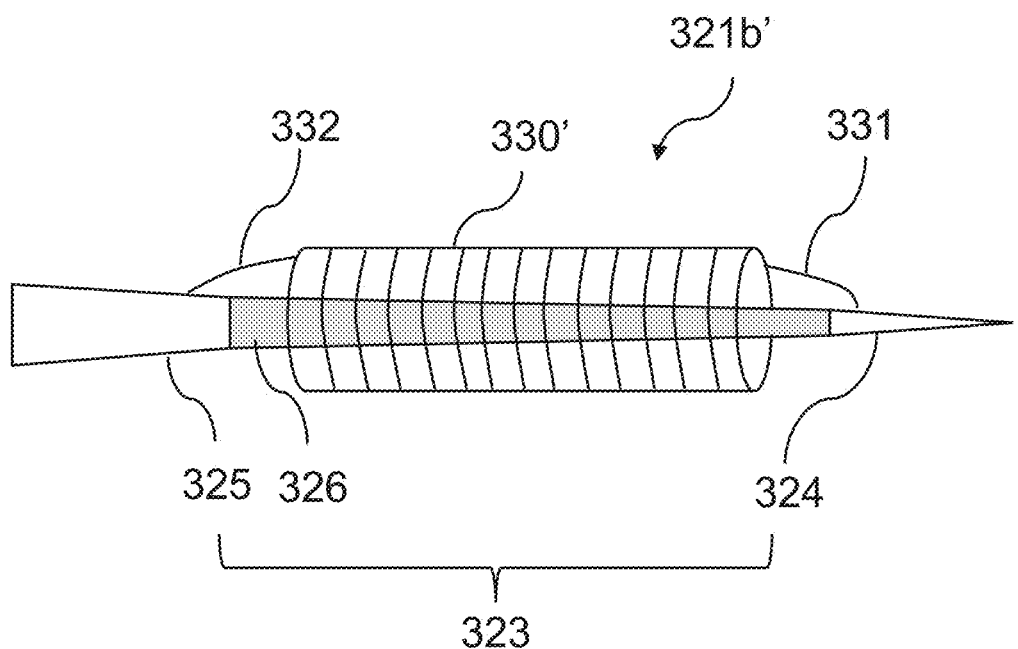

With reference to FIGS. 4A and 4B, shown are illustrations of embodiments of the inductive probing needles 321b, 321b' in the portion B of FIG. 3. The inductive probing needle 321b includes shaft 323 that includes first end section 324, second end section 325, and intermediate section 326 placed between the first end section 324 and the second end section 325. The first end section 324 and the second end section 325 are made of an electrically conductive material, and the intermediate section 326 is made of an electrically non-conductive material. In an embodiment, the intermediate section 326 may be an electrical insulator.

The inductive probing needle 321b further includes choke inductor 330. First terminal 331 of the choke inductor 330 is electrically connected to the first end section 324 of the shaft 323, and the second terminal 332 of the choke inductor 330 is electrically connected to the second end section 325 of the shaft 323. Herein, the choke inductor 330 has the functionality of cutting off or restricting alternating current (AC), while permitting DC. FIGS. 4A-4B exemplarily show coil choke inductors 330. The choke inductor, however, is not limited to the coil inductor shown in FIGS. 4A-4B. Any type of choke inductor may be employed for the inductive probing needle 321b. In the practical application, the choke inductor 330 may be placed to be as close to the device on the wafer as possible allowing minimal interference. In the other words, the shaft 323 may be constructed to have a minimized length of the first end section 324 to minimize interference.

FIG. 4A exemplarily shows inductive needle 321b with coil inductor 330 having a conical shape. Because the first end section 324 of the shaft 323 is narrower than the second end section 325, the coil inductor 330 has a conical shape in which the cone gradually tapers toward the end of the cone near the first terminal 331. It is to match the shape of the coil inductor 330 to the shape of the shaft 323. However, the shape of the coil choke inductor 330 is not limited to the cone shape. FIG. 4B exemplarily shows inductive needle 321b' with coil inductor 330' having a cylindrical shape. The shapes of the coil inductors are not limited to the shapes shown in FIGS. 4A-4B. When the coil inductor is used, the insulated wire of the coil inductor may wrap the intermediate section 326 of the shaft 323 as shown in FIGS. 4A-4B.

In the inductive needle 321b, the first section 324 of the shaft 323 is configured to contact a device or integrated circuits 132 formed on a wafer 131, and the second section 325 of the shaft 323 is configured to be coupled to a probe machine 110 to receive probing signals 143 from the probe machine 110. In an embodiment, the conductive probing needles 321a and the inductive probing needles 321b of the probe wedge or probe card 320 of the disclosed invention are configured to inspect integrated circuits on a wafer. For example, the integrated circuits may include SLCFET MMIC.

Figure 5:
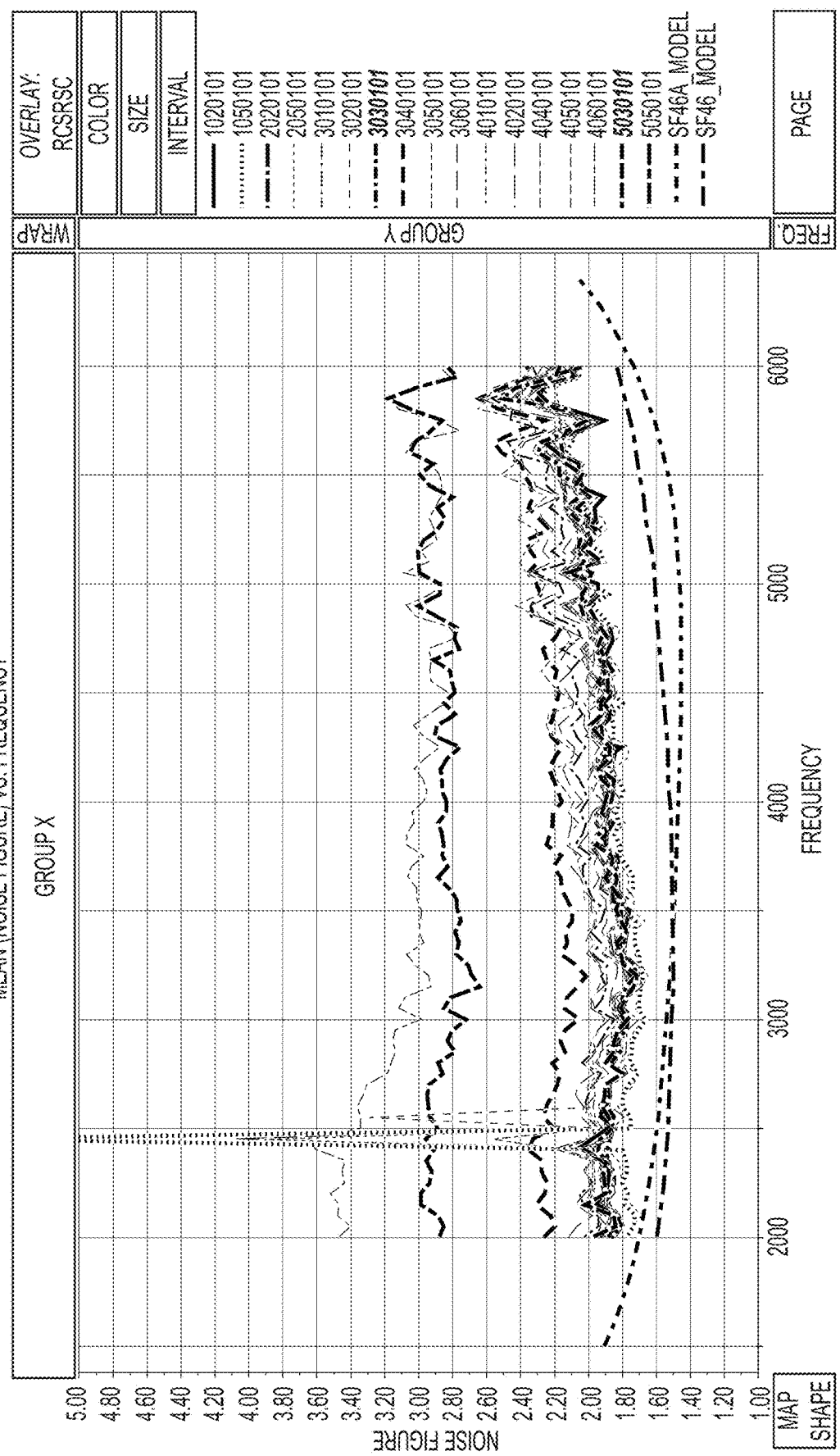
FIG. 5 is testing results obtained by using the probe wedge of the disclosed invention.

With reference to FIG. 5, shown is testing results obtained by using the probe wedge 320 of the disclosed invention. For the test, 7-pin multi-contact wedge probe (Model: GGB MCW-30-6748) from GGB Industries, Inc. was modified to install three (3) inductive needles. Three (3) broadband conical inductors (Model: CC50T36K240G5) from Piconics, Inc. were respectively integrated to the three (3) inductive needles. The Piconics's inductor has a 2.75 µF inductance, DC limit up to 700 mA, and small conical profile with a size of 0.120×0.315 inches (0.3048×0.8001 cm). The test was performed with MMICs (0.0-6.0 GHz) on wafers that do not have on-chip inductors. The graphs in FIG. 5 show wafer measured noise figure data of an LNA using the modified 7-pin multi-contact wedge probe. Noise signals were measured with various MMIC samples over frequency range of 2.0-6.0 GHz. The data shows low noise levels and is reasonably clustered together with a few outliners. Some data shows spikes at 2.4 GHz, but it turned out that the spikes were due to interference by cellular WiFi signals.

Since many modifications, variations, and changes in detail can be made to the described preferred embodiments of the invention, it is intended that all matters in the foregoing description and shown in the accompanying drawings be interpreted as illustrative and not in a limiting sense. Consequently, the scope of the invention should be determined by the appended claims and their legal equivalents.

What is claimed is:

1. A probe wedge or probe card configured for DC and RF probing tests of devices or integrated circuits, comprising:
   one or more inductive probing needles, wherein each inductive probing needle comprises:
      a shaft comprising a first end section, a second end section, and an intermediate section between the first and second end sections, wherein the first and second end sections are made of an electrically conductive material and the intermediate section is made of an electrically non-conductive material, and wherein the intermediate section is configured to electrically isolate the first and second end sections from each other; and
      a choke inductor comprising a first terminal and a second terminal, wherein the first terminal is connected to the first end section of the shaft and the second terminal is connected to the second end section of the shaft.

2. The probe wedge or probe card of claim 1 further comprising one or more conductive probing needles made of an electrically conductive material.

3. The probe wedge or probe card of claim 1 wherein the choke inductor comprises a coil inductor in which an insulated wire is wrapped around the intermediate section of the shaft.

4. The probe wedge or probe card of claim 3 wherein the coil inductor has a conical shape.

5. The probe wedge or probe card of claim 1 wherein the first section of the shaft is configured to contact a device formed on a wafer, and the second section of the shaft is configured to be coupled to the wafer probe system to receive probing signals from the probe system.

6. The probe wedge or probe card of claim 1 wherein the inductive probing needles are configured to inspect integrated circuits on a wafer, wherein the integrated circuits include Superlattice Castellated Field Effect Transistor (SLCFET) Monolithic Microwave Integrated Circuit (MMIC).

7. A wafer probe system card configured for DC and RF probing tests of devices or integrated circuits, comprising:
   a probe machine configured to supply probing signals to inspect one or more devices formed on a wafer; and
   a probe wedge or probe card coupled to the probe machine and receiving the probing signals from the probe machine, comprising:
      one or more inductive probing needles, wherein each inductive probing needle comprises:
         a shaft comprising a first end section, a second end section, and an intermediate section between the first and second end sections, wherein the first and second end sections are made of an electrically conductive material and the intermediate section is made of an electrically non-conductive material, and wherein the intermediate section is configured to electrically isolate the first and second end sections from each other; and
         a choke inductor comprising a first terminal and a second terminal, wherein the first terminal is connected to the first end section of the shaft and the second terminal is connected to the second end section of the shaft.

8. The wafer probe system of claim 7 wherein the probe wedge or probe card further comprises one or more conductive probing needles made of an electrically conductive material.

9. The wafer probe system of claim 7 wherein the choke inductor includes a coil inductor in which an insulated wire is wrapped around the intermediate section of the shaft.

10. The wafer probe system of claim 9 wherein the coil inductor has a conical shape.

11. The wafer probe system of claim 7 wherein the first section of the shaft is configured to contact the one or more devices formed on a wafer, and the second section of the shaft is coupled to the probe machine to receive probing signals from the probe machine.

12. The wafer probe system of claim 7 wherein the inductive probing needles are configured to inspect integrated circuits on the wafer, wherein the integrated circuits include Superlattice Castellated Field Effect Transistor (SLCFET) Monolithic Microwave Integrated Circuit (MMIC).

13. The wafer probe system of claim 7 further comprising a signal source that supplies the probing signals to the probe machine.

14. The wafer probe system of claim 13 wherein the signal source is configured to combine radio-frequency (RF) signals and direct current (DC) signals to generate the probing signals.

15. The wafer probe system of claim 14 wherein the signal source comprises a bias tee that is configured to combine the RF signals and the DC signals.

* * * * *